Patented May 15, 1951

2,552,574

UNITED STATES PATENT OFFICE 2,552,574

AMIDOTHIOPHOSPHATES

Clarence L. Moyle, Clare, and Eugene E. Kenaga, Midland, Mich., assignors to The Dow Chemical Company, Midland, Mich., a corporation of Delaware No Drawing. Application August 16, 1948, Serial No. 44,586

6 Claims. (Cl. 260—461)

This invention is directed to amidothiophosphates having the following formula

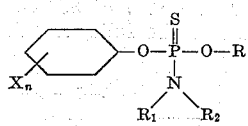

wherein each X represents halogen of the group consisting of bromine and chlorine, $n$ is an integer from 1 to 5, inclusive, R represents an alkyl or cycloalkyl radical, $R_1$ represents hydrogen or an alkyl radical, and $R_2$ represents cycloalkyl or an alkyl radical.

These compounds are oils or crystalline solids, somewhat soluble in many organic solvents, substantially insoluble in water, stable to light and air, not appreciably affected by carbon dioxide, and non-corrosive to the skin of man and higher animals. The new products are particularly valuable as constituents of fungicide and insecticide compositions. They may also be employed as modifiers in plastic compositions, as constituents of extreme pressure lubricants, and as intermediates for the preparation of more complex organic derivatives.

Various methods may be employed in the preparation of the new amidothiophosphates. A preferred procedure for preparing many of the products consists of reacting an anhydrous alkali metal halophenolate and alkali metal monohydric alcoholate with an N-substituted dichlorothiophosphoramide having the formula

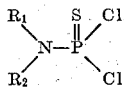

wherein $R_1$ represents hydrogen or an alkyl radical and $R_2$ represents a cycloalkyl or alkyl radical. Good yields are obtained in preparations employing equimolecular proportions of the reactants. The reaction may be carried out in an inert organic solvent and conveniently in an excess of the alcohol employed in preparation of the alcoholate. The halophenolate and alcoholate are successively reacted portionwise with the dichlorothiophosphoramide at a temperature of from 30° to 110° C., the optimal reaction temperature depending somewhat upon the particular reactants employed and the solvent in which the reaction is carried out. The reaction is exothermic and temperature control is maintained by the rate of addition of the reactants, as well as by the addition and subtraction of heat, if required. Following completion of the reaction, the amidothiophosphate product is separated by conventional means.

In a representative preparation, 1 mol of sodium and 1 mol of a halophenol are reacted together in an alcohol, and preferably that alcohol subsequently to be employed in preparation of the alcoholate. The resulting product is added portionwise to 1 mol of an N-substituted dichlorothiophosphoramide dispersed in the same alcohol, and the mixture subsequently warmed for a short period of time at a temperature of between 45° and 70° C. and thereafter cooled to room temperature. A sodium alcoholate solution of 1 mol of sodium in an excess of the alcohol previously employed is added portionwise to the intermediate product as obtained above. The reaction mixture is subsequently warmed for a short time at a temperature of 45°–70° C. to complete the reaction. Excess alcohol is then removed by evaporation, and the residue containing the reaction product is dissolved in a non-reactive water-immiscible organic solvent, such as methylene dichloride, carbon tetrachloride, or benzene. The resultant solution is successively washed with dilute aqueous sodium or ammonium hydroxide and water, and dried with anhydrous sodium sulphate. The amidothiophosphate product is then separated by evaporation of the solvent or by recrystallization from organic solvents. In an alternative procedure, the order of addition of the phenolate and alcoholate is reversed and the alcoholate is reacted with the N-substituted dichlorothiophosphoramide. The conditions of reaction and methods of separation are essentially as described above.

The N-substituted dichlorothiophosphoramides employed as starting materials, as above described, may be prepared by reacting a hydrochloride of a monoalkyl, monocycloalkyl, dialkyl or N-alkyl cycloalkylamine with a molecular excess of thiophosphoryl chloride ($PSCl_3$). Good yields are obtained in preparations employing from 2 to 4 mols of thiophosphoryl chloride per mol of the amine salt. The reaction is carried out at the boiling temperature of the reaction mixture and is accompanied by the evolution of hydrogen chloride. Following the reaction, the mixture is fractionally distilled under reduced pressure to obtain the N-substituted dichlorothiophosphoramide.

In another method of preparing certain of the new amidothiophosphates, an O-alkyl or O- cycloalkyl dichlorothiophosphate of the formula

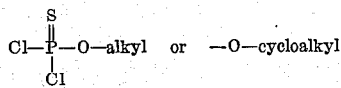

is reacted, first, with an alkali metal halophenolate and, second, with an alkyl or cycloalkylamine. Good yields are obtained by employing 2 mols of the amine and 1 mol each of the halophenolate and of the O-alkyl dichlorothiophosphate. The reaction may be carried out in an inert organic solvent, conveniently in ethyl alcohol. The halophenolate and amine are reacted portionwise at somewhat elevated temperature, e. g. from 30° to 110° C., with the O-alkyl dichlorothiophosphate. The amidothiophosphate product is then separated from the reaction mixture.

In a representative preparation, an ethyl alcohol dispersion of 1 mol of sodium halophenolate is added portionwise to 1 mol of an a O-alkyl dichlorothiophosphate, and the resulting mixture warmed for a short time at a temperature of from 60° to 90° C. The reaction mixture is then cooled to room temperature, 2 mols of the amine is added portionwise, and the mixture again warmed for a short time to from 60° to 90° C. The ethyl alcohol is then removed by evaporation and the residue dissolved in an inert water-immiscible organic solvent. This solution of the reaction product is successively washed with dilute aqueous hydrochloric acid, dilute aqueous ammonium or sodium hydroxide and water. The separation of the product is then accomplished by evaporation of the solvent. Where the amidothiophosphate product is a solid, it may be further purified by recrystallization from suitable organic solvents.

In an alternative procedure, an O-halophenyl dichlorothiophosphate of the formula,

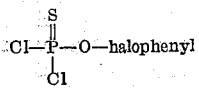

is successively reacted with an anhydrous alkali metal alcoholate and with an alkyl or cycloalkylamine. The conditions of the reaction and methods of separation are essentially as set forth in the preceding paragraphs.

The O-halophenyl dichlorothiophosphates and O-alkyl or O-cycloalkyl dichlorothiophosphates, which are employed as starting materials in the outlined procedures, may be prepared by reacting a molecular excess of thiophosphoryl chloride with an alkali metal halophenolate or alcoholate. Good results are obtained employing from 2 to 4 mols of thiophosphoryl chloride per mol of the alcoholate or halophenolate. The halophenolate or alcoholate, preferably as the sodium salt, is added portionwise with stirring to the thiophosphoryl chloride and the mixture subsequently warmed for a short time to complete the reaction. The crude reaction mixture is then filtered and the filtrate fractionally distilled under reduced pressure to separate the product.

The following examples illustrate the invention but are not to be construed as limiting.

*Example 1*

0.915 gram (0.04 mol) of sodium and 5.2 grams (0.04 mol) of 4-chlorophenol were reacted together in 39 grams of ethyl alcohol. This alcoholic dispersion was added portionwise over a period of 3 minutes to 6.6 grams (0.04 mol) of N-methyl dichlorothiophosphoramide dispersed in 20 grams of ethyl alcohol. The reaction mixture was then warmed for five minutes at a temperature of 50° to 60° C. and cooled to room temperature. 0.915 gram (0.04 mol) of sodium dissolved in 39 grams (0.85 mol) of ethyl alcohol was added portionwise over a period of 3 minutes to the intermediate product as obtained above, and the resulting mixture warmed for 5 minutes at a temperature of about 50° C. to complete the reaction. The excess alcohol was then removed from the crude reaction product by evaporation and the residue dispersed in methylene dichloride. This solvent solution of the reaction product was washed with dilute aqueous ammonium hydroxide and dried with anhydrous sodium sulphate. The methylene dichloride was then removed by evaporation to obtain an O-4-chlorophenyl O-ethyl-N-methyl-amidothiophosphate product as a colorless oil having a density of 1.13 at 26° C. and a refractive index $n/D$ of 1.5147 at 35° C. This amidothiophosphate has the following formula

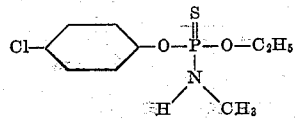

*Example 2*

2.3 grams (0.1 mol) of sodium and 12.85 grams (0.1 mol) of 4-chlorophenol were reacted together in 63 grams of ethyl alcohol. This mixture was added portionwise over a period of 5 minutes with stirring to 17.8 grams (0.1 mol) of N-ethyl dichlorothiophosphoramide dispersed in 20 grams of ethyl alcohol. The temperature was regulated at 35° to 45° C. during the addition, and then raised to 55°–65° C. to complete the reaction. The vessel and contents were then cooled to room temperature and 2.3 grams (0.1 mol) of sodium dissolved in 63 grams (1.37 mol) of ethyl alcohol added portionwise over a period of 10 minutes with stirring and cooling to 20° to 30° C. The mixture was then warmed at a temperature of 50° to 60° C. to complete the reaction. The ethyl alcohol was removed from the crude reaction product by evaporation, and the residue dispersed in methylene dichloride. The resultant solution was successively washed with dilute aqueous ammonium hydroxide and water, and dried with anhydrous sodium sulphate. The methylene dichloride was then removed by evaporation to obtain an O-4-chlorophenyl O-ethyl N-ethyl-amidothiophosphate product as a straw colored oil having a density of 1.12 at 27° C. and a refractive index $n/D$ of 1.5115 at 35° C. This amidothiophosphate has the formula

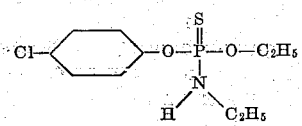

*Example 3*

1.03 grams (0.045 mol) of sodium and 5.8 grams (0.045 mol) of 4-chlorophenol were reacted together in 36 grams of ethyl alcohol. This mixture was added portionwise over a period of 3 minutes to 8.65 grams (0.045 mol) of N-isopropyl dichlorothiophosphoramide dispersed in 14 grams of ethyl alcohol. During the addition, the temperature of the reaction mixture rose to 50° C.

and was subsequently brought to 60°–65° C. for 10 minutes. The reaction vessel and contents were then cooled and 1.03 grams (0.045 mol) of sodium dissolved in 36 grams (0.78 mol) of ethyl alcohol added portionwise over a period of 5 minutes. The reaction mixture was maintained at a temperature of 50° to 55° C. during the addition, and was then warmed for 15 minutes at 65° C. to complete the reaction. The excess ethyl alcohol was removed by evaporation and the residue dispersed in methylene dichloride. The product was separated by washing successively with dilute aqueous ammonium hydroxide and water, drying with anhydrous sodium sulphate, and evaporating off the methylene dichloride. The residue was an O-4-chlorophenyl O-ethyl N-isopropylamidothiophosphate product in the form of a yellow oil having a density of 1.01 at 27° C. and a refractive index $n/D$ of 1.4880 at 35° C. This amidothiophosphate has the formula

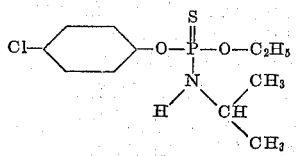

Example 4

3.22 grams (0.14 mol) of sodium, 110 grams (2.4 mols) of ethyl alcohol, 9.0 grams (0.07 mol) of 4-chlorophenol and 14.4 grams (0.07 mol) of N-normalbutyl dichlorothiophosphoramide were reacted together by the method of Example 2 to obtain an O-4-chlorophenyl O-ethyl N-normalbutylamidothiophosphate product. The latter was an orange colored oil having a density of 1.10 at 27° C. and a refractive index $n/D$ of 1.5033 at 35° C. This amidothiophosphate has the following formula

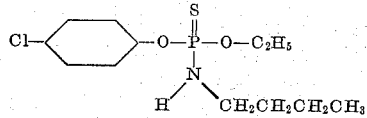

Example 5

2.3 grams (0.1 mol) of sodium and 12.85 grams (0.1 mol) of 4-chlorophenol were reacted together in 76 grams of ethyl alcohol. This mixture was added portionwise over a period of 5 minutes to 17.8 grams (0.1 mol) of N,N-dimethyl-dichlorothiophosphoramide. The temperature of the reaction mixture was maintained at 40° to 45° C. during the addition and was then raised to 55° to 60° C. for 5 minutes. The reaction vessel and contents were then cooled to 30° C. and 2.3 grams (0.1 mol) of sodium dissolved in 76 grams (1.76 mol) of ethyl alcohol added portionwise over a period of 5 minutes. The resulting mixture was warmed for 5 minutes at a temperature of 60° to 65° C. to complete the reaction. The separation was carried out in accordance with the method of Example 2 to obtain an O-4-chlorophenyl O-ethyl N,N-dimethylamidothiophosphate product as a colorless oil having a density of 1.17 at 23° C. and a refractive index $n/D$ of 1.5375 at 35° C. This amidothiophosphate has the formula

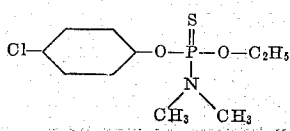

Example 6

1.84 grams (0.08 mol) of sodium and 14.25 grams (0.082 mol) of 4-bromophenol were reacted together in methyl alcohol. This alcoholic dispersion was added portionwise over a period of 5 minutes to 14.25 grams (0.08 mol) of N-ethyl dichlorothiophosphoramide dispersed in methyl alcohol. The temperature of the reaction mixture was regulated at 50° to 55° C. during the addition and subsequently raised to 55° to 60° C. for 5 minutes. The reaction vessel and contents were then cooled to 40° C. and 1.84 grams (0.08 mol) of sodium dissolved in a molecular excess of methyl alcohol added portionwise over a period of 5 minutes. The addition was carried out at a temperature of 40° to 50° C. The mixture was then warmed at 55° to 60° C. for 5 minutes to complete the reaction. The separation was carried out as described in Example 2 to obtain an O-4-bromophenyl O-methyl N-ethylamidothiophosphate product. The latter was a colorless oil having a density of 1.31 at 28° C. and a refractive index $n/D$ of 1.5195 at 35° C.

Example 7

2.3 grams (0.1 mol) of sodium and 17.3 grams (0.1 mol) of 4-bromophenol were reacted together in ethyl alcohol and the resulting phenolate product added portionwise over a period of 5 minutes to 17.8 grams (0.1 mol) of N-ethyl dichlorothiophosphoramide. The addition was carried out at a temperature of 50° to 60° C. The resulting mixture was warmed for 5 minutes at 60° to 65° C. and then cooled to room temperature. 2.3 grams (0.1 mol) of sodium dissolved in a molecular excess of ethyl alcohol was added over a period of 5 minutes and at a temperature of 45° to 55° C. to the above intermediate product. The reaction mixture was then warmed for 5 minutes at 55° to 60° C. Separation was made in a manner similar to that of Example 2 to obtain an O-4-bromophenyl O - ethyl N - ethylamidothiophosphate product as a colorless oil having a density of 1.11 at 28° C. and a refractive index $n/D$ of 1.4782 at 35° C.

Example 8

In a manner similar to that of Example 2, 2.3 grams (0.1 mol) of sodium, 78.9 grams (1.71 mols) of ethyl alcohol, 8.65 grams (0.05 mol) of 4-bromophenol and 8.95 grams (0.05 mol) of N,N-dimethyl dichlorothiophosphoramide were reacted together to obtain an O-4-bromophenyl O-ethyl N,N-dimethylamidothiophosphate product. The latter was a colorless oil having a density of 1.35 at 31° C. and a refractive index $n/D$ of 1.5527 at 35° C.

Example 9

1.15 grams (0.05 mol) of sodium and 9.9 grams (0.05 mol) of 2,4,5-trichlorophenol were reacted together in methyl alcohol and this product added portionwise over a period of 5 minutes to 8.2 grams (0.05 mol) of N-methyl dichlorothiophosphoramide. The addition was carried out at a temperature of 50° to 60° C., after which the reaction mixture was warmed for 5 minutes at 60° to 65° C. and then cooled to 40° C. 1.15 grams (0.05 mol) of sodium dissolved in a molecular excess of methyl alcohol was then added portionwise over a period of 5 minutes. The mixture was maintained at a temperature of 40° to 50° C. during the addition and then warmed for 5 minutes at 60° to 70° C. to complete the reaction. The separation was made in a manner similar to that of Example 2 to obtain an O-2,4,5-trichlorophenyl O-methyl N-methylamidothiophosphate product as a yellow oil having a density of 1.34 at 21° C. and a refractive index n/D of 1.5313 at 35° C.

Example 10

1.15 grams (0.05 mol) of sodium and 9.9 grams (0.05 mol) of 2,4,5-trichlorophenol were reacted together in methyl alcohol. This alcoholic dispersion was added portionwise to 8.95 grams (0.05 mol) of N-ethyl dichlorothiophosphoramide dispersed in methyl alcohol. The addition was carried out at a temperature of 40° to 55° C. The reaction mixture was then warmed for 5 minutes at 60° to 65° C. and cooled to 40° to 50° C. 1.15 grams (0.05 mol) of sodium dispersed in a molecular excess of methyl alcohol was added portionwise to the above reacted product and the mixture warmed for 5 minutes at 60° to 65° C. to complete the reaction. The crude reaction mixture was processed in the usual manner to obtain an O-2,4,5-trichlorophenyl O-methyl N-ethylamidothiophosphate product. The latter was a clear oil having a density of 1.14 at 28° C. and a refractive index n/D of 1.5206 at 35° C.

Example 11

2.3 grams (0.1 mol) of sodium, 79.8 grams (2.49 mols) of methyl alcohol, 9.9 grams (0.05 mol) of 2,4,5-trichlorophenol and 10.3 grams (0.05 mol) of N-normalbutyl dichlorothiophosphoramide were reacted as described in Example 9 to obtain an O-2,4,5-trichlorophenyl O-methyl N-normalbutylamidothiophosphate product in the form of a brown oil having a density of 1.10 at 28° C. and a refractive index n/D of 1.5268 at 35° C.

Example 12

1.85 grams (0.08 mol) of sodium and 15.8 grams (0.08 mol) of 2,4,5-trichlorophenol were reacted together in ethyl alcohol. This product was added portionwise with stirring to 13.1 grams (0.08 mol) of N-methyl dichlorothiophosphoramide. The temperature during the addition was maintained at 35° to 45° C. The mixture was subsequently warmed for 10 minutes at a temperature of 55° to 60° C. and cooled to 40° C. 1.85 grams (0.08 mol) of sodium dissolved in a molecular excess of ethyl alcohol was then added portionwise to the mixture. The temperature was regulated at 40° to 50° C. during the addition and then raised to 65° to 70° C. for 5 minutes to complete the reaction. The separation was accomplished in a manner similar to that of Example 2 to obtain an O-2,4,5-trichlorophenyl O-ethyl N-methylamidothiophosphate product. The latter was an orange oil having a density of 1.28 at 25° C. and a refractive index n/D of 1.5484 at 35° C.

Example 13

1.15 grams (0.05 mol) of sodium and 10.1 grams (0.051 mol) of 2,4,5-trichlorophenol were reacted together in ethyl alcohol, and the resulting product added portionwise over a period of 2 minutes with stirring to 8.9 grams (0.05 mol) of N-ethyl dichlorothiophosphoramide. The temperature of the reaction mixture gradually rose from 25° to 40° C. during the addition. The mixture was then warmed for 5 minutes at a temperature of about 55° C. The vessel and contents were then cooled and 1.15 grams (0.05 mol) of sodium dissolved in a molecular excess of ethyl alcohol added portionwise over a period of 2 minutes. The temperature of the mixture was about 50° C. during the addition and was held at 50° to 55° C. for 5 minutes thereafter to complete the reaction. The crude product was then evaporated to ½ its volume in an air stream and the organic products of reaction extracted with methylene dichloride. The methylene dichloride extract was processed in the usual manner to obtain an O-2,4,5-trichlorophenyl O-ethyl N-ethylamidothiophosphate product as a brown oil having a density of 1.22 at 23° C. and a refractive index n/D of 1.5343 at 35° C.

Example 14

An O-2,4,5-trichlorophenyl O-ethyl N-isopropylamidothiophosphate product was prepared in accordance with the method of Example 9 by reacting together 2.07 grams (0.09 mol) of sodium, 71 grams (1.54 mols) of ethyl alcohol, 8.9 grams (0.045 mol) of 2,4,5-trichlorophenol and 8.65 grams (0.045 mol) of N-isopropyl dichlorothiophosphoramide. This product was an orange oil having a density of 1.19 at 27° C. and a refractive index n/D of 1.5179 at 35° C.

Example 15

2.3 grams (0.1 mol) of sodium and 19.8 grams (0.1 mol) of 2,4,5-trichlorophenol were reacted together in ethyl alcohol. This mixture was added portionwise over a period of 5 minutes to 20.6 grams (0.1 mol) of N-normalbutyl dichlorothiophosphoramide. The temperature of the reaction mixture gradually rose to 55° C. during the addition and was subsequently maintained at 65° C. to 70° C. for 5 minutes. The reaction vessel and contents were then cooled to room temperature and 2.3 grams (0.1 mol) of sodium dissolved in a molecular excess of ethyl alcohol added portionwise over a period of 5 minutes. The resulting mixture was warmed for 5 minutes at 65° to 70° C. to complete the reaction. Separation of the desired product was carried out in the usual manner to obtain an O-2,4,5-trichlorophenyl O-ethyl N-normalbutylamidothiophosphate product as a straw colored oil having a density of 1.20 at 27° C. and a refractive index n/D of 1.5275 at 35° C.

Example 16

1.15 grams (0.05 mol) of sodium and 9.88 grams (0.05 mol) of 2,4,5-trichlorophenol were reacted together in 40 grams of ethyl alcohol. This alcoholic product was added portionwise over a period of 5 minutes to 8.95 grams (0.05 mol) of O-ethyl dichlorothiophosphate, temperature being maintained between 50° and 55° C. during the addition. The mixture was then stirred for 10 minutes at 55° C. and cooled to 30° C. 18.6 grams (0.1 mol) of normaldodecylamine was added portionwise to the intermediate product as obtained above. During the addition, the temperature of the mixture gradually rose to 55° C. and stirring was continued at this temperature for 5 minutes. The mixture was then warmed for 5 minutes at 60° C. The resulting crude reaction product was extracted with methylene dichloride and the solvent extract successively washed with dilute aqueous acetic acid, dilute aqueous sodium hydroxide, dilute aqueous ammonium hydroxide and water, and dried with anhydrous sodium sulphate. The excess methylene dichloride was then removed by evaporation to obtain an O-2,4,5-trichlorophenyl O-ethyl N-normaldodecylamidothiophosphate product. The latter was a yellow oil having a density of 1.10 at 25° C. and a refractive index n/D of 1.5133 at 35° C. This amidothiophosphate has the following formula

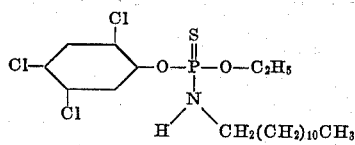

Example 17

1.84 grams (0.08 mol) of sodium and 15.8 grams (0.08 mol) of 2,4,5-trichlorophenol were reacted together in 59 grams of ethyl alcohol. The resulting alcoholic phenolate dispersion was added portionwise over a period of 5 minutes to 14.3 grams (0.08 mol) of O-ethyl dichlorothiophosphate. The temperature of the reaction mixture was maintained at 50° to 55° C. during the addition, and thereafter for 5 minutes at 60° to 65° C. with heating and stirring. The reaction vessel and contents were then cooled to 25° C. and 16 grams (0.16 mol) of cyclohexylamine added portionwise over a period of 5 minutes. The mixture was subsequently warmed at 50° to 55° C. for 5 minutes to complete the reaction. The ethyl alcohol was removed by evaporation and the residue dispersed in methylene dichloride. This solvent solution of the reaction product was successively washed with dilute aqueous hydrochloric acid, dilute aqueous ammonium hydroxide and water, and dried with anhydrous sodium sulphate. The methylene dichloride was then removed by evaporation to obtain an O-2,4,5-trichlorophenyl O-ethyl N-cyclohexyl amidothiophosphate product. The latter was a dark brown oil having a density of 1.28 at 26° C. and a refractive index n/D of 1.5407 at 35° C. This amidothiophosphate has the following formula

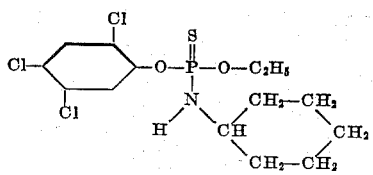

Example 18

1.15 grams (0.05 mol) of sodium and 9.88 grams (0.05 mol) of 2,4,5-trichlorophenol were reacted together in ethyl alcohol and the resulting dispersion added portionwise over a period of 5 minutes to 8.95 grams (0.05 mol) of N,N-dimethyl dichlorothiophosphoramide. The reaction temperature gradually rose to 40° C. during the addition and was thereafter maintained for 5 minutes at 55° to 60° C. 1.15 grams (0.05 mol) of sodium dissolved in a molecular excess of ethyl alcohol was added portionwise over a period of 5 minutes and at a pot temperature of 50° C. The resulting mixture was then warmed for 10 minutes at 60° C. to complete the reaction. This mixture was processed as described in Example 2 to obtain an O-2,4,5-trichlorophenyl O-ethyl N,N-dimethylamidothiophosphate product as an orange oil having a density of 1.32 at 31° C. and a refractive index n/D of 1.5461 at 35° C.

Example 19

An O-2,4,5-trichlorophenyl O-normalbutyl N-ethylamidothiophosphate product was prepared in accordance with the method of Example 9 by reacting together 3.7 grams (0.16 mol) of sodium, 97.2 grams (1.31 mols) of normalbutyl alcohol, 15.8 grams (0.08 mol) of 2,4,5-trichlorophenol and 14.25 grams (0.08 mol) of N-ethyl dichlorothiophosphoramide. This product was a yellow oil having a density of 1.07 at 23° C. and a refractive index n/D of 1.5208 at 35° C.

Example 20

1.15 grams (0.05 mol) of sodium and 96.2 grams (0.96 mol) of cyclohexyl alcohol were reacted together in 43.3 grams of toluene and the resulting dispersion added portionwise and with agitation over a period of 15 minutes to 8.9 grams (0.05 mol) of N-ethyl dichlorothiophosphoramide. The addition was carried out at a temperature of 80° to 90° C. Stirring was continued and the reaction mixture warmed for 10 minutes at 95° to 105° C., and then cooled to 65° to 70° C. 1.15 grams (0.05 mol) of sodium and 9.9 grams (0.05 mol) of 2,4,5-trichlorophenol were reacted in 59.9 grams of methyl alcohol to form the phenolate and the alcoholic mixture added portionwise to the crude reacted product as obtained above. The reaction mixture was then warmed for 10 minutes at 60° to 70° C. to complete the reaction. The methyl alcohol was removed by evaporation and the residue dispersed in benzene. This benzene solution was washed twice with dilute aqueous sodium hydroxide and dried with anhydrous sodium sulphate. Cyclohexyl alcohol, toluene and benzene were removed by partial fractionation of the mixture to obtain an O-2,4,5-trichlorophenyl O-cyclohexyl N-ethylamidothiophosphate product. The latter was an orange colored oil having a density of 1.07 at 27° C. and a refractive index n/D of 1.4954 at 35° C. This amidothiophosphate has the following formula

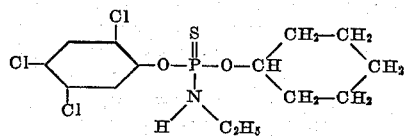

Example 21

In a similar fashion, 3.22 grams (0.14 mol) of sodium, 83.1 grams (0.45 mol) of normaldodecyl alcohol, 13.9 grams (0.07 mol) of 2,4,5-trichlorophenol and 12.4 grams (0.07 mol) of N-ethyl dichlorothiophosphoramide were reacted together. An emulsion which formed during the washing of the crude reaction product with aqueous sodium hydroxide was broken by the addition of a small amount of ethyl alcohol. The mixture divided into aqueous and solvent layers. The solvent layer was separated, washed with dilute aqueous ammonium hydroxide and dried with anhydrous sodium sulphate. Toluene, benzene, and the excess normaldodecyl alcohol were removed by partial fractionation of the mixture to obtain an O-2,4,5-trichlorophenyl O-normaldodecyl N-ethylamidothiophosphate product as a dark brown oil having a density of 1.035 at 28° C. and a refractive index n/D of 1.4798 at 32° C.

Example 22

1.85 grams (0.08 mol) of sodium and 15.8 grams (0.08 mol) of 2,4,6-trichlorophenol were reacted together in methyl alcohol and the resulting phenolate dispersion added portionwise to 15.4 grams (0.08 mol) of N-isopropyl dichlorothiophosphoramide. One-half of the alcoholic phenolate dispersion was added over a period of 5 minutes and at a reaction temperature of 45° to 50° C., and the balance over a period of 10 minutes and at a temperature of 50° to 57° C. The reaction mixture was then warmed for 10 minutes at 55° C. and cooled to room temperature. 1.85 grams (0.08 mol) of sodium dissolved in a molecular excess of methyl alcohol was added portionwise over a period of 10 minutes to the product as obtained above, and the resulting mixture stirred for 5 minutes at 30° to 35° C. The separation of the desired product was made in the usual manner to obtain an O-2,4,6-trichlorophenyl O-methyl N-isopropylamidothiophosphate product as a crystalline solid melting at 43°–45° C. and having a density of 1.19 at 33° C. and a refractive index $n/D$ of 1.5088 at 35° C.

Example 23

3.7 grams (0.16 mol) of sodium, 79.8 grams (2.49 mols) of methyl alcohol, 15.8 grams (0.08 mol) of 2,4,6-trichlorophenol and 14.3 grams (0.08 mol) of N-ethyl dichlorothiophosphoramide were reacted together as described in Example 2 to obtain an O-2,4,6-trichlorophenyl O-methyl N-ethylamidothiophosphate product as an oily liquid having a specific gravity of 1.20 at 26° C. and a refractive index $n/D$ of 1.5137 at 35° C.

Example 24

1.85 grams (0.08 mol) of sodium and 26.5 grams (0.079 mol) of 2,4,6-tribromophenol were reacted together in methyl alcohol and the resulting dispersion added portionwise over a period of 5 minutes to 14.25 grams (0.08 mol) of N-ethyl dichlorothiophosphoramide. The addition was carried out at a temperature of 50° to 60° C. and the mixture subsequently warmed for 5 minutes at 60° to 65° C. 1.85 grams (0.08 mol) of sodium dissolved in a molecular excess of methyl alcohol was added portionwise over a period of 15 minutes and at a reaction temperature of 55° to 65° C. The mixture was then warmed for 5 minutes at 60° to 65° C. to complete the reaction. The crude reaction mixture was processed in the usual fashion to obtain an O-2,4,6-tribromophenyl O-methyl N-ethylamidothiophosphate product as an orange colored oil having a density of 1.37 at 28° C. and a refractive index $n/D$ of 1.5235 at 35° C.

Example 25

1.15 grams (0.05 mol) of sodium and 9.9 grams (0.05 mol) of 2,4,6-trichlorophenol were reacted together in ethyl alcohol. The resulting alcoholic phenolate dispersion was added portionwise over a period of 5 minutes to 8.2 grams (0.05 mol) of N-methyl dichlorothiophosphoramide. The temperature rose to 55° C. during the addition. The mixture was then warmed at the boiling temperature and under reflux for 10 minutes and cooled to 50° C. 1.15 grams (0.05 mol) of sodium dissolved in a molecular excess of ethyl alcohol was added portionwise over a period of 5 minutes at 50° C. The reaction mixture was then warmed for 10 minutes at a temperature of from 65° to 70° C. to complete the reaction. The separation of the desired product was carried out in accordance with the method of Example 2 to obtain an O-2,4,6-trichlorophenyl O-ethyl N-methyl amidothiophosphate product as a dark orange oil having a density of 1.26 at 20° C. and a refractive index $n/D$ of 1.5375 at 35° C.

Example 26

2.3 grams (0.1 mol) of sodium and 19.8 grams (0.1 mol) of 2,4,6-trichlorophenol were reacted together in ethyl alcohol. This alcoholic phenolate dispersion was added portionwise over a period of 15 minutes with stirring to 17.8 grams (0.1 mol) of N-ethyl dichlorothiophosphoramide. The temperature of the reaction mixture gradually rose to 55° C. during the addition of the first 2/3 of the dispersion and was maintained at 65° to 70° C. during the addition of the latter third. The resulting mixture was warmed for 10 minutes at a temperature of 70° to 75° C. and then cooled to room temperature. 2.3 grams (0.1 mol) of sodium dissolved in a molecular excess of ethyl alcohol was added portionwise over a period of 10 minutes to the mixture as obtained above. During the addition, the temperature rose to 35° C. and was subsequently brought to 70° to 80° C. for 20 minutes to complete the reaction. The separation was carried out as described in Example 2 to obtain an O-2,4,6-trichlorophenyl O-ethyl N-ethylamidothiophosphate product as a dark brown oil having a density of 1.24 at 27° C. and a refractive index $n/D$ of 1.5352 at 35° C.

Example 27

2.3 grams (0.1 mol) of sodium and 19.75 grams (0.1 mol) of 2,4,6-trichlorophenol were reacted together in ethyl alcohol. This mixture was added portionwise over a period of 5 minutes with stirring to 20.6 grams (0.1 mol) of N-isopropyl dichlorothiophosphoramide dispersed in ethyl alcohol. The temperature of the reaction mixture was maintained at 50° to 55° C. during the addition. Stirring was continued and the mixture warmed for 5 minutes at a temperature of 60° to 70° C. 2.3 grams (0.1 mol) of sodium dissolved in a molecular excess of ethyl alcohol was then added portionwise over a period of 5 minutes. The temperature during the addition was regulated at 50° to 55° C. and subsequently raised to 60° to 70° C. for 5 minutes to complete the reaction. The separation was carried out in a manner similar to Example 2 to obtain an O-2,4,6-trichlorophenyl O-ethyl N-isopropylamidothiophosphate product. The latter was a brown oil having a density of 1.24 at 26° C. and a refractive index $n/D$ of 1.5086 at 35° C.

Example 28

1.15 grams (0.05 mol) of sodium and 9.9 grams (0.05 mol) of 2,4,6-trichlorophenol were reacted together in 39.9 grams of ethyl alcohol. This mixture was added portionwise over a period of 5 minutes to 10.3 grams (0.05 mol) of N-normal-butyl dichlorothiophosphoramide dispersed in 16 grams of ethyl alcohol. The reaction mixture was maintained at a temperature of 45° to 55° C. during the addition and subsequently warmed for 5 minutes at 60° to 70° C. 1.15 grams (0.05 mol) of sodium dispersed in 39.9 grams (0.86 mol) of ethyl alcohol was added portionwise over a period of 5 minutes to the crude product as obtained above. The temperature during the addition was maintained at about 50° C. and subsequently raised to 60° to 70° C. for 5 minutes to complete the reaction. An O-2,4,6-trichlorophenyl O-ethyl N-normalbutylamidothiophosphate product was separated in the manner described in Example 2. This product was a brown oil having a density of 1.20 at 26° C. and a refractive index $n/D$ of 1.5208 at 35° C. This amidothiophosphate has the following formula

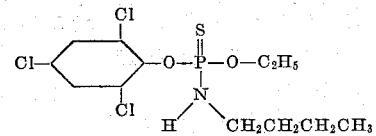

Example 29

1.15 grams (0.05 mol) of sodium and 9.88 grams (0.05 mol) of 2,4,6-trichlorophenol were reacted together in ethyl alcohol and the resulting product added portionwise over a period of 5 minutes to 8.95 grams (0.05 mol) of N,N-dimethyl dichlorothiophosphoramide. The addition was carried out at a temperature of 55° to 60° C. and the mixture thereafter warmed at 65° to 70° C. to complete the reaction. 1.15 grams (0.05 mol) of sodium dissolved in a molecular excess of ethyl alcohol was added portionwise over a period of 5 minutes to the reacted product as obtained above. The addition was carried out at a temperature of 55° to 60° C. and the resulting mixture thereafter warmed at 60° to 65° C. to complete the reaction. Separation was accomplished as described in Example 2 to obtain an O-2,4,6-trichlorophenyl O-ethyl N,N-dimethylamidothiophosphate product as a brown oil.

*Example 30*

1.85 grams (0.08 mol) of sodium and 15.8 grams (0.08 mol) of 2,4,6-trichlorophenol were reacted together in normalbutyl alcohol. This product was added portionwise over a period of 10 minutes to 14.25 grams (0.08 mol) of N-ethyl dichlorothiophosphoramide at temperatures of 52° to 55° C. The mixture was then warmed to 60° to 65° C. to complete the reaction. 1.85 grams (0.08 mol) of sodium dissolved in a molecular excess of normalbutyl alcohol was added portionwise to the reaction mixture over a period of 5 minutes at temperatures gradually increasing from 45° to 55° C. The resulting mixture was then warmed at 60° to 65° C. to complete the reaction. The separation of the desired product was made in the usual manner to obtain an O-2,4,6-trichlorophenyl O-normalbutyl N-ethylamidothiophosphate product as a brown oil.

*Example 31*

3.7 grams (0.16 mol) of sodium, 119.7 grams (3.74 mols) of methyl alcohol, 18.6 grams (0.08 mol) of 2,3,4,6-tetrachlorophenol and 14.3 grams (0.08 mol) of N-ethyl dichlorothiophosphoramide were reacted together as described in Example 2 to obtain an O-2,3,4,6-tetrachlorophenyl O-methyl N-ethylamidothiophosphate product. The latter was an orange oil having a density of 1.31 at 27° C. and a refractive index $n/D$ of 1.5407 at 35° C.

*Example 32*

2.3 grams (0.1 mol) of sodium, 78.9 grams (1.71 mols) of ethyl alcohol, 11.6 grams (0.05 mol) of 2,3,4,6-tetrachlorophenol and 8.2 grams (0.05 mol) of N-methyl dichlorothiophosphoramide were reacted together by the method of Example 2 to obtain an O-2,3,4,6-tetrachlorophenyl O-ethyl N-methylamidothiophosphate product as an orange oil having a density of 1.38 at 20° C. and a refractive index $n/D$ of 1.5622 at 35° C.

*Example 33*

2.3 grams (0.1 mol) of sodium and 23.2 grams (0.1 mol) of 2,3,4,6-tetrachlorophenol were reacted together in methyl alcohol. This solution was added portionwise over a period of 20 minutes to 17.8 grams (0.1 mol) of N,N-diethyl dichlorothiophosphoramide in the presence of 0.02 gram of potassium iodide as catalyst. The addition was carried out at a temperature of 60° to 65° C. and with subsequent warming for 10 minutes at the boiling temperature of the reaction mixture (60° to 65° C.). 2.3 grams (0.1 mol) of sodium dissolved in a molecular excess of methyl alcohol was added portionwise over a period of 5 minutes at a temperature of 48° to 53° C. The mixture was then warmed for 2 minutes at the boiling temperature (65° C.). The separation was carried out in the usual manner to obtain an O-2,3,4,6-tetrachlorophenyl O-methyl N,N-diethylamidothiophosphate product as a yellow oil having a density of 1.19 at 27° C. and a refractive index $n/D$ of 1.5082 at 30° C.

*Example 34*

1.85 grams (0.08 mol) of sodium and 21.3 grams (0.08 mol) of pentachlorophenol were reacted together in methyl alcohol and this product added portionwise over a period of 10 minutes to 14.3 grams (0.08 mol) of N-ethyl dichlorothiophosphoramide. Temperature was maintained at 55° to 65° C. during the addition and subsequently raised to the boiling temperature of the mixture to complete the reaction. 1.85 grams (0.08 mol) of sodium dissolved in a molecular excess of methyl alcohol was then added portionwise over a period of 5 minutes and at a temperature of 40° to 50° C. The reactor and contents were thereafter warmed at 50° to 60° C. to complete the reaction. The separation of the desired product was made in the usual manner to obtain an O-pentachlorophenyl O-methyl N-ethylamidothiophosphate product as a dark brown oil having a density of 1.35 at 27° C. and a refractive index $n/D$ of 1.5471 at 35° C. Upon standing, this product slowly solidified to give a crystalline material melting at 85°–91° C.

*Example 35*

An O-pentachlorophenyl O-ethyl N-methylamidothiophosphate product was prepared in accordance with the method of Example 2 by reacting together 2.3 grams (0.1 mol) of sodium, 78.9 grams (1.71 mols) of ethyl alcohol, 13.3 grams (0.05 mol) of pentachlorophenol and 8.2 grams (0.05 mol) of N-methyl dichlorothiophosphoramide. This product was a dark brown oil having a density of 1.39 at 20° C. and a refractive index $n/D$ of 1.5640 at 35° C. Upon standing, this product slowly solidified to give a crystalline material softening at 96° C. and melting at 96°–113° C.

*Example 36*

1.15 grams (0.05 mol) of sodium and 13.38 grams (0.05 mol) of pentachlorophenol were reacted together in ethyl alcohol. This alcoholic phenolate solution was added portionwise over a period of 10 minutes to 8.95 grams (0.05 mol) of N-ethyl dichlorothiophosphoramide dispersed in ethyl alcohol. The temperature of the reaction mixture was maintained at 60° to 65° C. during the addition and subsequently raised to 70° to 75° C. to complete the reaction. 1.15 grams (0.05 mol) of sodium dissolved in a molecular excess of ethyl alcohol was then added portionwise at a pot temperature of 40° to 55° C. The resulting mixture was warmed at 65° to 70° C. to complete the reaction. The crude reaction mixture was processed in the usual fashion to obtain an O-pentachlorophenyl O-ethyl N-ethylamidothiophosphate product as crystalline solid melting at 99°–101° C. and having a density of 1.32 at 25° C. and a refractive index $n/D$ of 1.5465 at 35° C.

*Example 37*

2.3 grams (0.1 mol) of sodium and 26.65 grams (0.1 mol) of pentachlorophenol were reacted together in 63.12 grams of ethyl alcohol. This alcoholic solution was added portionwise over a period of 5 minutes to 20.6 grams (0.1 mol) of N-isopropyl dichlorothiophosphoramide dispersed in 20 grams of ethyl alcohol. The addition was carried out at 60° to 70° C. and the mixture subsequently warmed at 65° to 70° C. 2.3 grams (0.1 mol) of sodium dissolved in 63.12 grams (1.37 mols) of ethyl alcohol was then added portionwise over a period of 5 minutes at a reaction temperature of 55° to 65° C. The resulting mixture was warmed at 65° to 70° C. to complete the reaction. Separation was accomplished in the usual fashion to obtain an O-pentachlorophenyl O-ethyl N-isopropylamidothiophosphate product as a dark brown oil having a density of 1.31 at 26° C. and a refractive index $n$/D of 1.5349 at 35° C. Upon standing this product slowly solidified to give a crystalline material softening at 96° C. and melting at 140°–148° C. This amidothiophosphate has the following formula

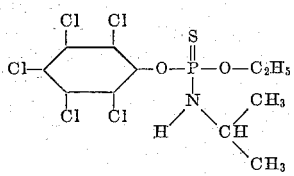

Example 38

1.15 grams (0.05 mol) of sodium and 13.38 grams (0.05 mol) of pentachlorophenol were reacted together in ethyl alcohol and the resulting product added portionwise over a period of 5 minutes at 60°–70° C. to 8.95 grams (0.05 mol) of N,N-dimethyl dichlorothiophosphoramide. The mixture was then warmed at the boiling temperature to complete the reaction. 1.15 grams (0.05 mol) of sodium dissolved in a molecular excess of ethyl alcohol was then added portionwise to the intermediate reaction product as obtained above. The addition was carried out at a temperature of 55° to 60° C. and the reaction mixture subsequently warmed for 10 minutes at 65° to 70° C. The mixture was processed as described in Example 2 to obtain an O-pentachlorophenyl O-ethyl N,N-dimethylamidothiophosphate product as a viscous dark brown oil.

Example 39

1.84 grams (0.08 mol) of sodium and 21.3 grams (0.08 mol) of pentachlorophenol were reacted together in ethyl alcohol, and the resulting product added portionwise over a period of 5 minutes to 14.3 grams (0.08 mol) of O-ethyl dichlorothiophosphate. The addition was carried out at a temperature of 60° to 65° C. The reaction mixture was then warmed for 5 minutes to boiling temperature and cooled to 25° C. 16 grams (0.16 mol) of cyclohexylamine was added portionwise to the above product over a period of 5 minutes, and the resulting mixture warmed for 5 minutes at 50° C. The separation was accomplished as described in Example 17 to obtain an O-pentachlorophenyl O-ethyl N-cyclohexylamidothiophosphate product. The latter was a dark brown oil having a density of 1.32 at 27° C. and a refractive index $n$/D of 1.5445.

Example 40

2.3 grams (0.1 mol) of sodium and 25.2 grams (0.1 mol) of 2,4-dibromophenol were reacted together in methyl alcohol and the resulting dispersion added portionwise over a period of 5 minutes to 17.8 grams (0.1 mol) of N-ethyl dichlorothiophosphoramide. The addition was carried out at a temperature of 50° to 60° C. and the mixture subsequently warmed for 5 minutes to boiling temperature and under reflux. The vessel and contents were cooled to 45° C. and 2.3 grams (0.1 mol) of sodium dissolved in a molecular excess of methyl alcohol was added portionwise over a period of 5 minutes and at a temperature of 45° to 50° C. Stirring was continued and the mixture warmed for 5 minutes at 50° to 55° C. The separation was carried out as described in Example 2 to obtain an O-2,4-dibromophenyl O-methyl N-ethylamidothiophosphate product as a pale orange colored oil having a density of 1.24 at 28° C. and a refractive index $n$/D of 1.5010 at 35° C.

Example 41

2.3 grams (0.1 mol) of sodium and 16.3 grams (0.1 mol) of 2,4-dichlorophenol were reacted together in methyl alcohol. This product was added portionwise over a period of 5 minutes to 17.8 grams (0.1 mol) of N-ethyl dichlorothiophosphoramide dispersed in methyl alcohol. The addition was carried out at a temperature of 50° to 53° C. and the mixture thereafter warmed for 10 minutes at the boiling temperature (68° C.). The reactor and contents were cooled to room temperature and 2.3 grams (0.1 mol) of sodium dissolved in a molecular excess of methyl alcohol was added portionwise over a period of 5 minutes. The temperature was regulated at 30° to 40° C. during the addition and the mixture then warmed for 10 minutes at 50° to 55° C. The crude reaction product was processed in the usual manner to obtain an O-2,4-dichlorophenyl O-methyl N-ethylamidothiophosphate product as a colorless oil having a density of 1.22 at 27° C. and a refractive index $n$/D of 1.4974 at 30° C.

Example 42

1.38 grams (0.06 mol) of sodium and 11.9 grams (0.06 mol) of 2,4,5-trichlorophenol were reacted together in 63 grams of ethyl alcohol. This mixture was added portionwise over a period of 5 minutes to 10.75 grams (0.06 mol) of O-ethyl dichlorothiophosphate. The addition was carried out at a temperature of 50° to 55° C. and the mixture subsequently warmed for 10 minutes at 55° to 60° C. The reactor and contents were cooled to room temperature and 15.5 grams (0.12 mol) of N,N-dinormalbutylamine dissolved in 24 grams of ethyl alcohol was added portionwise over a period of 10 minutes. The temperature during the addition was maintained at 45° to 50° C. and subsequently raised to 55° to 60° C. for 5 minutes. The separation was made as described in Example 17 to obtain an O-2,4,5-trichlorophenyl O-ethyl N,N-dinormalbutylamidothiophosphate product as a yellow oil having a density of 1.20 at 27° C. and a refractive index $n$/D of 1.5283 at 30° C. Upon standing, this product slowly crystallized to form a low melting solid. This amidothiophosphate has the following formula

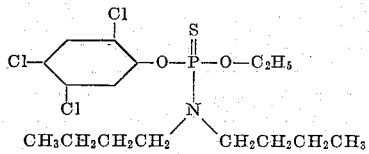

Example 43

2.3 grams (0.1 mol) of sodium and 24.2 grams (0.1 mol) of 4-bromo-2,6-dichlorophenol were reacted together in 72 grams of methyl alcohol. This mixture was added portionwise over a period of 5 minutes to 17.8 grams (0.1 mol) of N-ethyl dichlorothiophosphoramide at a pot temperature of 53° and 56° C. The resulting product was warmed for 15 minutes at 55° to 60° C. and cooled to room temperature. 2.3 grams (0.1 mol) of sodium dissolved in 72 grams (2.25 mol) of methyl alcohol was added portionwise over a period of 5 minutes and with cooling to 25° to 35° C. The separation was carried out in the usual fashion to obtain an O - 4 - bromo - 2,6 - dichlorophenyl O-methyl N-ethylamidothiophosphate product as a yellow oil having a density of 1.39 at 27° C. and a refractive index $n/D$ of 1.5323 at 30° C. This amidothiophosphate has the following formula

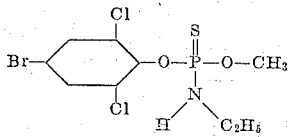

In a similar manner other amidothiophosphate products may be prepared of which the following are representative:

O-2-bromophenyl O-isopropyl N,N-diisopropylamidothiophosphate by reacting together the sodium salt of isopropyl alcohol, sodium 2-bromophenolate, and N,N-diisopropyl dichlorothiophosphoramide.

O-2-chlorophenyl O-normaldecyl N - ethylamidothiophosphate by reacting together the sodium salt of normaldecyl alcohol, sodium 2-chlorophenolate, and N-ethyl dichlorothiophosphoramide.

O-2,5-dichlorophenyl O-ethyl N-normaloctylamidothiophosphate by reacting together the sodium salt of ethyl alcohol, sodium 2,5-dichlorophenolate, and N-normaloctyl dichlorothiophosphoramide.

O-2,6-dichlorophenyl O-normaloctyl N-ethylamidothiophosphate by reacting together the sodium salt of normaloctyl alcohol, sodium 2,6-dichlorophenolate and N-ethyl dichlorothiophosphoramide.

O-2,4,5-trichlorophenyl O-ethyl N-secondarybutylamidothiophosphate by reacting together the sodium salt of ethyl alcohol, sodium 2,4,5-trichlorophenolate and N-secondarybutyl dichlorothiophosphoramide.

O-2,4,6-trichlorophenyl O-secondarybutyl N-ethylamidothiophosphate by reacting together the sodium salt of secondarybutyl alcohol, sodium 2,4,6-trichlorophenolate and N-ethyl dichlorothiophosphoramide.

O-2,4,5-trichlorophenyl O-normalhexyl N-normalhexylamidothiophosphate by reacting together sodium 2,4,5-trichlorophenolate, normalhexylamine and O-normalhexyl dichlorothiophosphate.

O-4-chlorophenyl O-4-cyclohexylcyclohexyl N-ethylamidothiophosphate by reacting together the sodium salt of 4-cyclohexylcyclohexyl alcohol, sodium 4-chlorophenolate and N-ethyl dichlorothiophosphoramide.

O-4-chlorophenyl O-4-phenylcyclohexyl N-isopropylamidothiophosphate by reacting together the sodium salt of 4-phenylcyclohexyl alcohol, sodium 4-chlorophenolate and N-isopropyl dichlorothiophosphoramide.

O-pentachlorophenyl O-2-methylcyclohexyl N-cyclohexylamidothiophosphate by reacting together sodium pentachlorophenolate, cyclohexylamine and O-2-methylcyclohexyl dichlorothiophosphate.

O-pentachlorophenyl O-ethyl N-cyclohexyl-N-methylamidothiophosphate by reacting together sodium pentachlorophenolate, N-cyclohexyl-N-methylamine and O-ethyl dichlorothiophosphate.

O-2,4,6-trichlorophenyl O-secondarybutyl N,N-dinormaloctylamidothiophosphate by reacting together sodium 2,4,6-trichlorophenolate, dinormaloctylamine and O-secondarybutyl dichlorothiophosphate.

O-2,4,6-trichlorophenyl O-ethyl N-normalhexyl-N-methylamidothiophosphate by reacting together sodium 2,4,6-trichlorophenolate, N-normalhexyl-N-methylamine and O-ethyl dichlorothiophosphate.

O-4-bromophenyl O-isopropyl N-4-tertiarybutylcyclohexylamidothiophosphate by reacting together sodium 4-bromophenolate, 4-tertiarybutylcyclohexylamine and O-isopropyl dichlorothiophosphate.

O-4-chlorophenyl O-ethyl N-2,4-dimethylcyclohexylamidothiophosphate by reacting together sodium 4-chlorophenolate, 2,4-dimethylcyclohexylamine and O-ethyl dichlorothiophosphate.

We have found that the new amidothiophosphate products are effective as insecticides and fungicides and are adapted to be employed for the control of a wide range of agricultural and household pests. They may be applied to growing vegetation in amounts required for insect control with negligible injury to plant foliage. For such parasiticidal use, the products may be dispersed on a finely divided solid and employed as dusts. Also, such mixtures may be dispersed in water with the aid of a wetting agent, and the resulting aqueous suspensions employed as sprays. In other procedures, the new products may be employed in oils, as constituents of oil in water emulsions, or in water dispersions with or without the addition of emulsifying, wetting, or dispersing agents. Suitable concentrations of the toxicants in dusts are in the order of from about 0.1 to 10 per cent by weight of the dust, and in liquid suspensions from about 0.10 to 2 pounds per 100 gallons of the spray mixture.

Aqueous spray compositions containing the amidothiophosphate products of the preceding examples have been tested against two-spotted spider mite, bean aphid, Mexican bean beetle larvae and southern army worm. Such compositions have been found effective against the test organisms at toxicant concentrations of from 0.1 to 1 pound per 100 gallons of spray mixture. With many of the products, a 100 per cent kill of all four test organisms has been obtained with aqueous sprays containing from 0.25 to 1 pound of the toxicant per 100 gallons. Similarly, sprays containing the new products have been found to control fungus organisms such as bean mildew at concentrations below 1 pound per 100 gallons. Against such pests as American roach nymphs and milkweed bugs 100 per cent kills in 48 hours have been obtained by allowing the insects to feed upon white flour containing 1 per cent or less by weight of many of the new products.

In a representative operation, a concentrate was prepared by mixing together 60 parts by weight of a product consisting essentially of O-2,4,5-trichlorophenyl O-ethyl N-ethylamidothiophosphate, 10 parts of the dioctyl ester of sodium sulfosuccinic acid (Aerosol OT), and 30 parts of refined kerosene. This concentrate was dispersed in water to form spray compositions. 100 per cent kills of two-spotted spider mite, bean aphid, Mexican bean beetle larvae, southern army worm, and bean mildew were obtained with toxicant concentrations per 100 gallons of spray mixture of 0.12, 1.00, 0.12, 0.25, and 0.5 pound, respectively.

In a further determination, 99 parts by weight of white flour and 1 part of a product consisting essentially of O-pentachlorophenyl O-ethyl N-ethylamidothiophosphate were mechanically mixed and dispersed together. When American roach nymphs and milkweed bugs were allowed to feed upon this composition, 100 per cent kills of the insects were obtained in less than 48 hours.

Many of the new amidothiophosphate products have been tested by intraperitoneal injection of rats to determine their animal toxicity. In such determinations, these compounds have been found to be significantly less toxic than many other insecticidal materials.

We claim:

1. An amidothiophosphate having the following formula

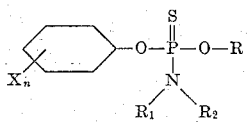

wherein each X represents halogen of the group consisting of bromine and chlorine, $n$ is an integer from 1 to 5, inclusive, R represents a member of the group consisting of cycloalkyl and alkyl radicals, $R_1$ represents a member of the group consisting of hydrogen and alkyl radicals, and $R_2$ represents a member of the group consisting of cycloalkyl and alkyl radicals.

2. O-2,4,6-trichlorophenyl O-ethyl N-normal-butylamidothiophosphate.

3. O-pentachlorophenyl O-ethyl N-isopropyl-amidothiophosphate.

4. O-4-bromo-2,6-dichlorophenyl O-methyl N-ethylamidothiophosphate.

5. O-pentachlorophenyl O-methyl N-ethylamidothiophosphate.

6. O-pentachlorophenyl O-ethyl N-methylamidothiophosphate.

CLARENCE L. MOYLE.
EUGENE E. KENAGA.

REFERENCES CITED

The following references are of record in the file of this patent:

UNITED STATES PATENTS

| Number | Name | Date |
| --- | --- | --- |
| 2,172,241 | Dickey et al. | Sept. 5, 1939 |
| 2,250,049 | Moyle | July 22, 1941 |

FOREIGN PATENTS

| Number | Country | Date |
| --- | --- | --- |
| 500,386 | Great Britain | Feb. 8, 1939 |